United States Patent [19]

Rosenthal et al.

[11] Patent Number: 5,764,748
[45] Date of Patent: Jun. 9, 1998

[54] ADVANCED CALL WAITING PROCESSING

[75] Inventors: Eugene J. Rosenthal, Edison; Rhoda Yaker, Annandale, both of N.J.

[73] Assignee: Lucent Technologies Inc., Murray Hill, N.J.

[21] Appl. No.: 722,688

[22] Filed: Sep. 30, 1996

[51] Int. Cl.$^6$ .............................. H04M 3/58; H04M 3/00; H04M 15/06; H04M 3/54
[52] U.S. Cl. .................... 379/215; 379/142; 379/196; 379/210; 379/243; 379/246
[58] Field of Search .................... 379/188, 196, 379/197, 198, 201, 207, 210, 211, 212, 214, 215, 127, 246, 142, 243

[56] References Cited

U.S. PATENT DOCUMENTS

| | | | |
|---|---|---|---|
| 4,277,649 | 7/1981 | Sheinbein | 379/215 X |
| 4,899,358 | 2/1990 | Blakley | 379/67 |
| 4,947,421 | 8/1990 | Toy et al. | 379/67 |
| 5,007,076 | 4/1991 | Blakley | 379/67 |
| 5,309,512 | 5/1994 | Blackmon et al. | 379/67 X |
| 5,425,092 | 6/1995 | Quirk | 379/215 |
| 5,604,796 | 2/1997 | Yamazaki | 379/215 |
| 5,619,561 | 4/1997 | Reese | 379/215 X |

Primary Examiner—Harry S. Hong
Attorney, Agent, or Firm—Eugene J. Rosenthal

[57] ABSTRACT

An enhanced call waiting (ECW) feature is provided by a switch serving a called subscriber who, while still on a first telephone call, receives a subsequent telephone call. According to ECW, the switch provides service so that the called party may select from processing treatments for the second call which, in addition to the conventional processing of a) placing the first telephone call on hold and answering the second telephone call request, or b) simply declining the subsequent telephone call request, include treatments such as: 1) declining acceptance of the subsequent telephone call request but signaling the subsequent telephone call originator, via a message, to call again at a predetermined time or at the end of a specified period of time; 2) declining acceptance of the subsequent telephone call request and signaling the subsequent telephone call originator, via a message, that the called subscriber will return the call at a predetermined time or at the end of a specified period of time; 3) bridging the subsequent telephone call originator with the first telephone call to establish a conference; 4) directing, via a message, that the telephone call be transferred to another telephone number, e.g., a secretary or voice messaging system, that is specified as part of the message; or 5) disabling call waiting while the called subscriber remains on the first call, (i) for this particular caller, (ii) for all callers except those listed on a so-called "exception" list, or (iii) for all callers.

22 Claims, 6 Drawing Sheets

ADVANCED CALL WAITING PROCESSING

TECHNICAL FIELD

This invention relates to the providing of call waiting.

BACKGROUND OF THE INVENTION

Call waiting is a well known telephony service. Call waiting is typically provided by a switch of a network of a first contact carrier for a called subscriber, e.g., a local exchange carrier (LEC) for wireline telephones or a wireless carrier for wireless telephones. Call waiting may also be provided by the switches of a network of a carrier that is not a first contact carrier for the called subscriber, e.g., a long-distance—or so-called interexchange—carrier (IXC).

Typically, when a subscriber is on a first telephone call using a telephone for which call waiting is provisioned and a second telephone call destined for that telephone arrives at the switch serving that telephone, the telephone switch momentarily interrupts the first telephone call and supplies an alerting indication to the called subscriber to indicate the arrival of the second telephone call. The called subscriber then has the option to switch between the first and second telephone calls. In one prior art embodiment of call waiting, e.g., as disclosed in U.S. Pat. No. 5,007,076, issued to J. R. Blakely, which is incorporated herein by reference, an indication of the identity of the party placing the second telephone call is supplied to the called subscriber, so that he can determine if he wishes to answer the second telephone call or not.

SUMMARY OF THE INVENTION

I have recognized that when a telephone call is established between two parties that even advanced call waiting features can be further improved upon. Therefore, in accordance with the principles of the invention, messaging, conferencing capability, and disabling of call waiting for the incoming call and subsequent calls while the called subscriber remains on the first call may be provided on calls that are subject to call waiting processing. In one embodiment of the invention, a switch serving a called subscriber who receives a subsequent telephone call while he is still on the first telephone call provides such enhanced call waiting service (ECW). The switch a) recognizes that the incoming telephone call request is for a subscriber who is already engaged on a first telephone call, b) determines that the called subscriber is a subscriber to the enhanced call waiting feature, c) alerts the called subscriber to the arrival of the subsequent telephone call request, and d) processes the subsequent telephone call request in accordance with instructions indicated by the called subscriber. The processing of the subsequent telephone call request may include, in addition to the conventional responses of a) placing the first telephone call on hold and answering the second telephone call request, or b) simply declining acceptance of the subsequent telephone call request, the additional responses, in accordance with the principles of the invention, of: 1) declining acceptance of the subsequent telephone call request but signaling the subsequent telephone call originator, via a message, to call again at a predetermined time or at the end of a specified period of time; 2) declining acceptance of the subsequent telephone call request and signaling the subsequent telephone call originator, via a message, that the called subscriber will return the call at a predetermined time or at the end of a specified period of time; 3) bridging the subsequent telephone call originator with the first telephone call to establish a conference; 4) directing, via a message, that the telephone

2 call be transferred to another telephone number, e.g., a secretary or voice messaging system, that is specified as part of the message; or 5) disabling call waiting while the called subscriber remains on the first call, (i) for this particular caller, (ii) for all callers except those listed on a so-called "exception" list, or (iii) for all callers. The alerting may be, for example, 1) audible, either inserted within the communication path of the first telephone call or external thereto, or 2) visual, e.g., an alerting icon or a visual message displayed on a screen. Either form of alerting may include an indication of the identity of the subscriber originating the subsequent telephone call request.

In accordance with another aspect of the invention, the caller may respond to the called subscriber's message with a message of his own.

DETAILED DESCRIPTION

Figure 1:
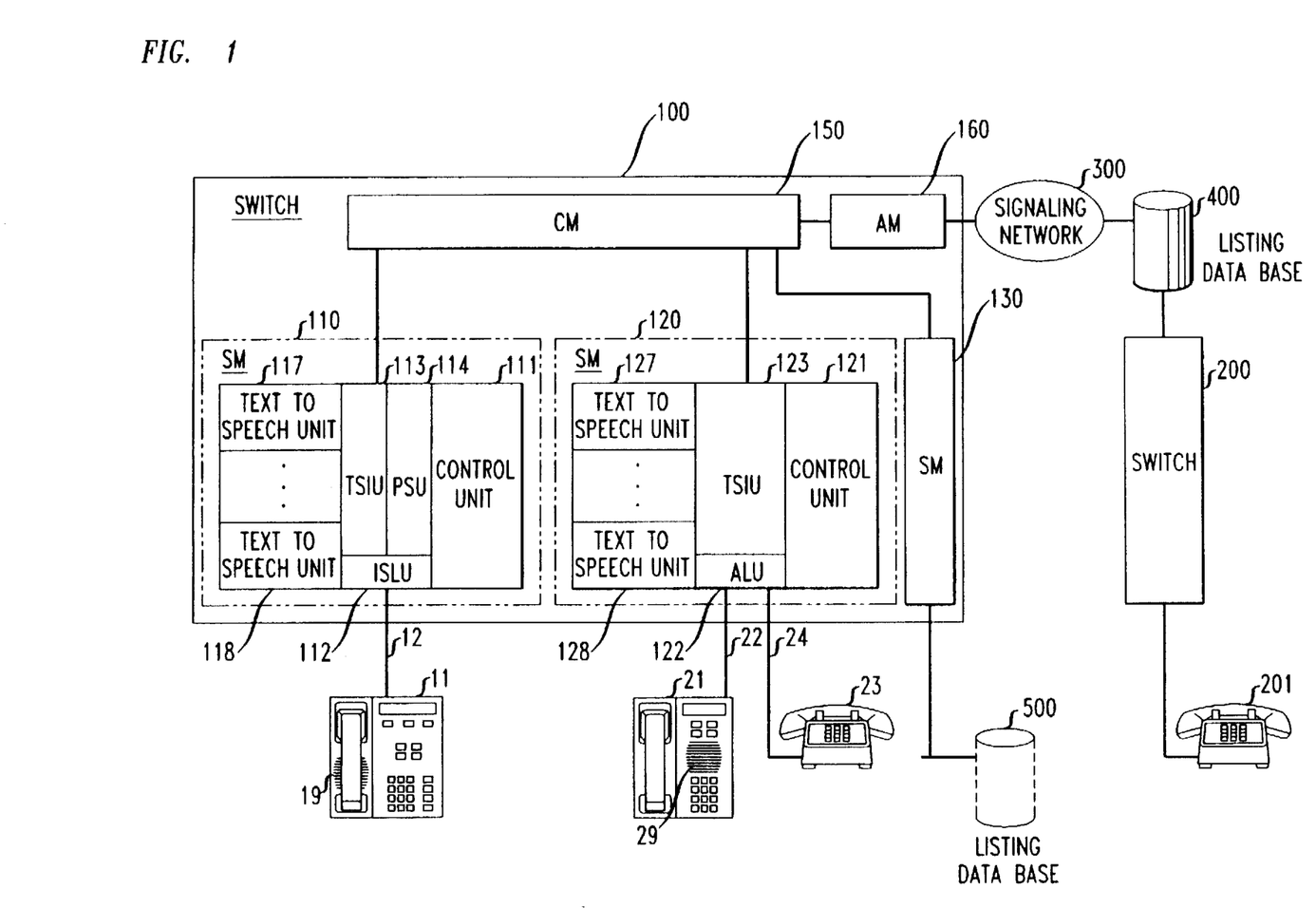
FIG. 1 shows an exemplary arrangement for providing enhanced call waiting (ECW) with messaging and conferencing, in accordance with the principles of the invention.

An exemplary arrangement for providing enhanced call waiting (ECW) with messaging and conferencing is described herein in the context of the exemplary switching network system shown in FIG. 1. Enhanced call waiting (ECW) is provided when a subscriber who is an ECW subscriber receives a subsequent telephone call at a time that the subscriber is already active on a first telephone call. A switch in the system a) recognizes that the incoming telephone call request is for a called subscriber who is already engaged on a first telephone call, b) determines that the called subscriber is a subscriber to the enhanced call waiting feature, c) alerts the called subscriber to the arrival of the subsequent telephone call request, and d) processes the subsequent telephone call request in accordance with instructions of the called subscriber. The processing of the subsequent telephone call request may include, in addition to the conventional responses of a) placing the first telephone call on hold and answering the second telephone call request, or b) simply declining acceptance of the subsequent telephone call request, the additional responses, in accordance with the principles of the invention, of 1) declining acceptance of the subsequent telephone call request but signaling the subsequent telephone call originator, via a message, to call again at a predetermined time or at the end of a specified period of time; 2) declining acceptance of the subsequent telephone call request and signaling the subsequent telephone call originator, via a message, that the called subscriber will return the call at a predetermined time or at the end of a specified period of time; 3) bridging the subsequent telephone call originator with the first telephone call to establish a conference; 4) directing, via a message, that the telephone call be transferred to another telephone number, e.g., a secretary, voice messaging system, or other location which need not be local to the transferring switch, that is specified as part of the message; or 5) disabling call waiting, while the called subscriber remains on the first call, (i) for this particular caller, (ii) for all callers except those listed on a so-called "exception" list, or (iii) for all callers.

The arrangement of FIG. 1 has two central office switches 100 and 200, an interswitch signaling network 300, e.g., a CCS7 network, a listing database 400 accessed via signaling network 300, and illustrative communication stations including conventional analog stations 23 and 201, an integrated services digital network (ISDN) speakerphone station 11, and an analog speakerphone station 21 that is specially adapted for providing call announcements. Telephones stations such as stations 11 and 21 can readily be constructed by those of ordinary skill in the telephone station set art. For example, such telephone stations are disclosed in U.S. Pat. Nos. 4,899,358 and 5,007,076, issued to J. R. Blakely, which are incorporated herein by reference. Switches 100 and 200 are interconnected by a communication path 26 which may include intermediate switches.

An integrated services digital network (ISDN) is a network that typically provides end-to-end digital connectivity to support a wide range of services, including voice and non-voice services, to which users have access via a set of multipurpose customer interfaces. Illustratively, switch 100 is a distributed control, ISDN switching system such as the system disclosed in U.S. Pat. No. 4,592,048 issued to M. W. Beckner et al., on May 27, 1986. However, many other available switches, e.g., the No. 4 Electronic Switching System (4ESS) or the No. 5 Electronic Switching System (5ESS), both available from Lucent Technologies, may be adapted, or enhanced by adjunct units, by those of ordinary skill in the art for the purpose of practicing the invention. It is noted that those of ordinary skill in the art of switch design will be able to design other switches with the functionality of the invention built in.

Switch 100 has communications module (CM) 150 as a hub, with the switching modules (SMs) 110, 120, and 130, and an administrative module (AM) 160 emanating therefrom. Each switching module has a control unit that provides call processing and overall control and maintenance functions for its switching module. The switching module control units in the different switching modules communicate with each other and with the administrative module 160 through a message switch (not shown) in the communications module 150, using an internal message protocol. Communications module 150 also includes a time-shared, space-division switch or time-multiplexed switch (not shown), that provides 64 kilobits per second circuit-switched paths for switching 64 kilobits per second channels, referred to as B-channels, between switching modules. Thus, communications module 150 supports B-channel traffic between switching modules. It also supports packet traffic between packet switching units (PSUs) which are located in different switching modules.

The architecture of switch 100 provides flexibility in placing specific processing functions in specific processing elements. The general strategy behind the architecture is to place much of the required processing capability in the switching module control units, while reserving the administrative module 160 for those functions that are inherently centralized. The call processing functions can be distributed in a number of ways. In one exemplary embodiment of switch 100, most of the call processing functions are placed in the switching module control units, with routing, terminal hunting, and path hunt functions located in the administrative module. In another exemplary embodiment of switch 100, all call processing functions are placed in the switching module control units, with the administrative module reserved for truly administrative processing.

Switch 100 is connectable to analog and digital stations and inter-switch trunks via its switching modules (SM). The switching modules of switch 100 may each be associated with a different subset of stations or trunks. As noted, each switching module includes a control unit, one function of which is to control connections to and from its associated switching modules stations or trunks. Switching module 110, for example, includes control unit 111 for controlling connections to and from station 11. Similarly, switching module 120 includes control unit 121 for controlling connections to and from stations 21 and 23.

Switching module 110 includes an integrated services line unit (ISLU) 112 which terminates the digital subscriber lines, e.g., 12, and provides access to a time-slot interchange unit (TSIU) 113 and a packet switching unit (PSU) 114. Each ISDN station communicates with switch 100 using two 64 kilobits per second channels B-channels and in one 16 kilobits per second channel, which is referred to as a D-channel. Each of the B-channels is usable to convey digitized voice samples at the rate of 8000, eight-bit samples per second or data at a rate of 64 kilobits per second. The D-channel is used both to convey signaling packets to effect message signaling between ISDN stations and switching module control units, and to convey data packets between different ISDN stations.

In the present embodiment, information is conveyed between ISDN station 11 and switch 100 using a four-wire, digital subscriber line (DSL) 12 using one pair of wires for each direction of transmission. DSL 12 transmits a serial bit stream at the rate of 192 kilobits per second, which includes: a) 144 kilobits per second for the above-mentioned two 64 kilobits per second B-channels and the 16-kilobits per second D-channel, and b) a 48 kilobits per second channel used for a number of functions, including: framing, DC balancing, control and maintenance. DSL 12 represents what is referred to by the International Telegraph and Telephone Consultative Committee (CCITT) as a T-interface. The use of the T-interface is only exemplary, however, as the invention is equally applicable to systems using other access methods.

Signaling packets are conveyed between ISDN stations and the switching module control units enclosed in level 2 (link-level) frames in accordance, for example, with the standard LAPD protocol. The exemplary signaling messages used for the control of circuit-switched voice calls are in accordance with CCITT recommendation Q.931.

ISLU 112 detects messages generated by the station in response to actions taken thereat by the subscriber, e.g., button presses and changes in switch hook state, and passes such information along to control unit 111 so that it may take appropriate action. Messages for display on ISDN stations may also be generated by control unit 111, and these are processed by ISLU 112 to be passed on to the station for display thereat.

TSIU 113 and PSU 114 respectively provide circuit-switched and packet-switched connections to and from the associated station 11 under the control of control unit 111. Switching module 110 further includes a number of text-to-speech units (TTS), e.g., 117, 118, for generating speech signals from text to provide call announcements, in accordance with the invention, and transmitting such speech signals via TSIU 113 and ISLU 112, e.g., to station 11 or to a calling party, such as telephone 201. One illustrative text-to-speech unit is the DECTALK DCT03 unit manufactured by Digital Equipment Corporation.

Switching module 120 includes an analog line unit (ALU) 122 which terminates conventional analog lines, e.g., 22 and 24, and provides access to a TSIU 123. ALU 122 detects signals originated at the station in response to actions taken thereat by the subscriber, e.g., dual tone multi-frequency (DTMF) signals generated in response to button presses and switch hook flashes in response changes in switch hook state, and passes information corresponding to such actions on to control unit 121 so that it may take appropriate action in response thereto. Messages for display on display-capable analog stations may also be generated by control unit 111, and these are processed by ALU 122 to be passed on to the station, e.g., station 21 for display thereat. Such messages may be transmitted, for example, using dual tone multi-frequency (DTMF) signaling or the well known incoming caller line identification (ICLID) signals.

TSIU 123 provides circuit-switched connections to and from the associated stations 21 and 23 under the control of control unit 121. Switching module 120 also includes a number of text-to-speech units, e.g., 127, 128. In the present example, switch 100 has text-to-speech units associated with both switching modules 110 and 120. However, switch 100 may be configured so that text-to-speech units associated with a single switching module are usable by connection through communications module 150 for stations served by other switching modules.

Switching module 130 is similar to switching modules 110 and 120 but, rather than line units, it includes the appropriate analog or digital trunk unit (not shown) for interfacing with the outgoing trunk(s) included in communication path 26 to switch 200. In an alternative embodiment (shown by dashed lines in FIG. 1), switching module 130 accesses a listing database 500 via a digital X.25 trunk 25, rather than administrative module 160 accessing listing database 400 via signaling network 300.

To complete the description of FIG. 1, switch 200 is shown connected to a conventional analog station 201 used, for purposes of illustration, as the originating station of the second telephone call in the examples described herein. The architecture of switch 200 and the types of stations served by switch 200 are not important to the present invention and are not described further herein.

The subscriber may activate or deactivate the service using feature codes entered from the subscriber terminal keypad. The calling subscriber may deny forwarding of his/her name either with a one time service request or on a per call basis, in the conventional manner.

From the network perspective, the service operates as follows. Originating switch 200 sends the calling line identification (CLID) to the terminating switch 100 via signaling network 300. If the called subscriber's line is not busy, the call is processed in the conventional manner. However, if the called subscriber's line is busy, terminating switch 100 determines whether or not the called subscriber is an ECW subscriber. If the called subscriber is not an ECW subscriber, the call is processed in the conventional manner, e.g., a busy is supplied to the caller or a conventional call waiting treatment is invoked.

If the called subscriber is an ECW subscriber, the called subscriber is notified of the arrival of the second call. With the enhanced call waiting (ECW) feature, additional information may be supplied to the called subscriber. Thus, the conventional call waiting tone may be replaced by, or supplemented with, a text-to-speech announcement, or visual display, of the calling party name (CPN) for the second caller or another message, which may contain the CPN. Calling line identification (CLID) information may be supplied along with the CPN. If the CPN is not available, the CLID is supplied to the called subscriber. If neither the CPN nor the CLID is available, other information, such as toll call or unlisted number, is supplied to the caller. If the line is privacy protected, a message such as "unlisted name" is supplied to the caller. To obtain the CPN, terminating switch 100 launches a query to listing database 400 or, alternatively, listing database 500. Terminating switch 100 connects on the voice path to the ECW subscriber, synthesizes the calling party name (CPN) and waits for a signal from the subscriber.

If switch 100 receives the connect signal from the subscriber, switch 100 connects the calling party and the subscriber as with conventional call waiting.

If the subscriber does not answer or denies the ECW call, the call may be transferred to a message center or voice storage system and a text-to-speech header message is provided in conjunction with the caller's message to assure an accurate caller name, caller number and time stamp.

FIGS. 2–6 present a flow chart depicting exemplary processing of an incoming call by switch 100 in accordance with the principles of the invention. The process is entered in step 701 when a subsequent telephone call arrives for a subscriber who is already connected on a first telephone call. In conditional branch point 703 it is determined whether the called directory number (DN) belongs to a subscriber of the enhanced call waiting (ECW) feature. If the called DN does not belong to an ECW subscriber, conventional call processing treatment continues in step 705 for the subsequent telephone call. The process then exits in step 989. If the called DN does belong to an ECW subscriber, processing proceeds from step 703 to step 721, in which the enhanced call waiting processing is initiated.

Figure 2:
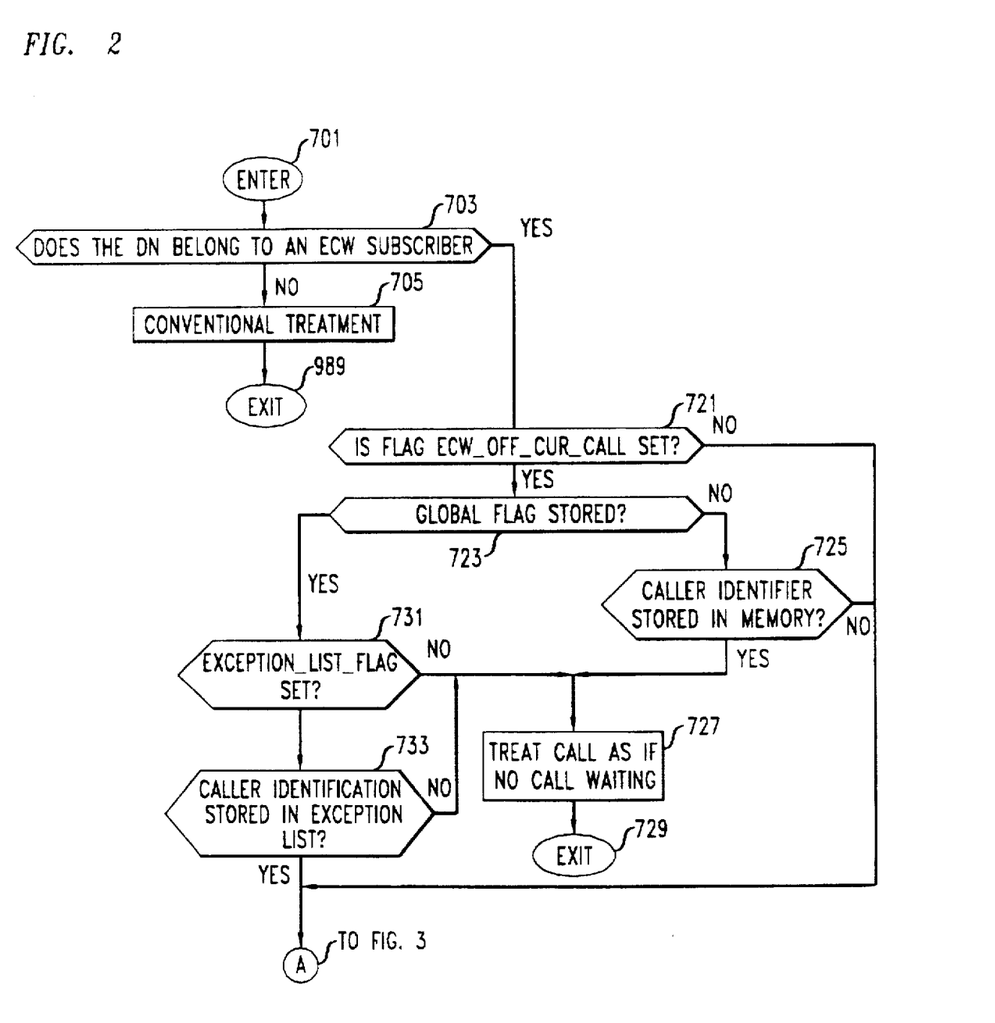
FIGS. 2–6 present a flow chart depicting exemplary processing of an incoming call by switch 100 in accordance with the principles of the invention.

In conditional branch point 721 it is determined whether the flag ECW_OFF_CUR_CALL is set or not. The flag ECW_OFF_CUR_CALL is set when the called subscriber had previously received another call while he was on the current call and he indicated, at that time, in accordance with an aspect of the invention, a desire to disable, or limit, the operation of call waiting. If the determination in step 721 is that ECW_OFF_CUR_CALL is not set, then enhanced call waiting is enabled for all calls, and control passes to conditional branch point 751 for processing, as described further below.

If the determination in step 721 is that ECW_OFF_CUR_CALL is indeed set, then call waiting has been disabled or limited, and control passes to conditional branch point 723 to determine to what extent call waiting is disabled or limited. In particular, in conditional branch point 723 it is determined whether or not a global flag has been stored in memory in a list, e.g., at the head of the list, of particular callers who have previously called during the existence of the current call and for whom the called subscriber has disabled call waiting. If it is determined in step 723 that the global flag has not been stored, control passes to conditional branch point 725, in which it is determined if information identifying the second caller has been stored by the called subscriber in the memory list. If the determination in step 725 is that information identifying the second caller has been stored in the memory list, control passes to step 727, in which the call is processed as if there were no call waiting provisioned for the called telephone. The process then exits in step 729. If the determination in step 725 is that information identifying the second caller has not been stored in the list, control passes to conditional branch point 751.

If the determination in step 723 is that a global flag has been stored in the memory list of the called subscriber, then conditional branch point 731 tests to determine if a flag, e.g., exception_List_Flag, is set. Exception_List_Flag is set when the called subscriber wishes to disable call waiting for the call he is on for all callers except for those callers that are specifically identified in a prestored so-called "exception list". Such an exception list would typically include the telephone numbers of high priority callers, e.g., one's spouse, child, or boss. If the determination in step 731 is that Exception_List_Flag is not set, this indicates that all calls should be treated as if there is no call waiting. Therefore, control passes to step 727 and the process continues as described above.

If the determination in step 731 is that Exception_List_Flag is set, control passes to conditional branch point 733, in which it is determined if information identifying the second caller is stored within the called subscriber's exception list. If the determination in step 733 is that information identifying the second caller is not stored within the called subscriber's exception list, this indicates that the call should be treated as if there is no call waiting. Therefore, control passes to step 727 and the process continues as described above. If the determination in step 733 is that information identifying the second caller is stored within the called subscriber's exception list, this indicates that call waiting should be provided for the second callers call. Therefore, control passes to step 751.

Figure 3:
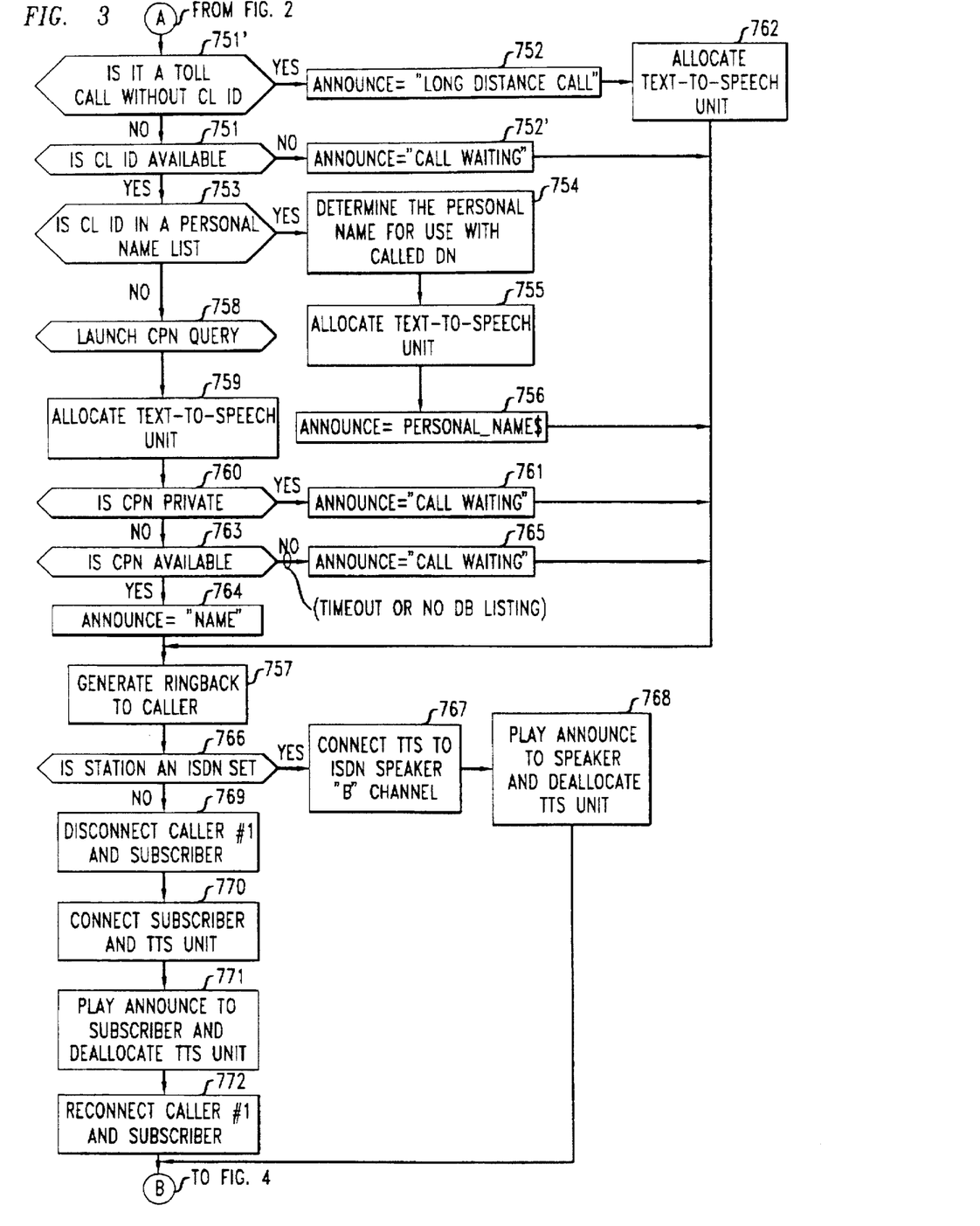

In conditional branch point 751 it is determined whether the call is a toll call without an available CLID. If a negative determination is made in step 751, execution proceeds to conditional branch point 751', where it is determined whether the CLID is available. If the CLID is not available, a variable, ANNOUNCE, is set equal to "CALL WAITING" in step 752'. If the CLID is available, execution proceeds to conditional branch point 753, where it is determined whether the CLID is in a personal name list, stored for example in control unit 11 of switch 100 (FIG. 1). This feature allows the association of personal names with different calling DNs for a given called DN. If the CLID is in a personal name list, execution proceeds to step 754, and the personal name to be used is determined from the calling DN. In step 755, an available text-to-speech unit, e.g., 117 (FIG. 1), is allocated. A variable, e.g., ANNOUNCE, is set equal to PERSONAL—NAME$, which is a string containing the determined personal name, in step 756 and ringback is generated to the caller in step 757.

Returning to step 753, if the CLID is not in a personal name list, execution proceeds to step 758 and a calling party name (CPN) query is launched (either via signaling network 300 (FIG. 1) to database 400 or via X.25 link 25 to database 500) to determine a calling party name associated with the calling station. In step 759, an available text-to-speech unit is allocated. Execution proceeds to conditional branch point 760, where a determination is made of whether the CPN is private. If the CPN is private, the variable ANNOUNCE is set equal to "CALL WAITING" in step 761 and ringback is generated to the caller in step 757. If the CPN is not private, execution proceeds to conditional branch point 763 to determine whether the text comprising the CPN is now available. If there is no CPN listed in the database, or if a time-out occurs, execution proceeds from step 763 to step 765, where the variable ANNOUNCE is set equal to "CALL WAITING". If in step 763 it is determined that the CPN has been obtained, execution proceeds to step 764 and the variable ANNOUNCE is set equal to NAME$, which is a string having the value of the obtained CPN. Execution proceeds to step 757, and ringback is generated to the caller.

Returning to step 751, if a positive determination is made indicating that the call is a toll call without CLID, execution proceeds to step 752, and the variable ANNOUNCE is set equal to "LONG DISTANCE CALL". An available text-to-speech unit is allocated in step 762, and ringback is generated to the caller in step 757.

From step 757, execution proceeds to conditional branch point 766, where a determination is made of whether the called station is an ISDN set. If the station is an ISDN set, for example station 11 (FIG. 1), execution proceeds to step 767, where the allocated text-to-speech unit is connected to an ISDN B-channel on DSL 12 (FIG. 1). In step 768, the text comprising the variable ANNOUNCE is used to generate speech signals for transmission to station 11 (FIG. 1), and the text-to speech unit is thereafter deallocated. Execution proceeds to conditional branch point 601.

If the determination made in step 766 indicates that the called station is not an ISDN set, for example it is conventional analog station 23 (FIG. 1), execution proceeds to step 769, where the first caller and the called subscriber, or at least the transmit path from the first caller to the called subscriber, are temporarily disconnected. Note that this does not mean that the call from the first caller to the switch is torn down; instead the first caller is put on hold. In step 770, the allocated text-to-speech unit is connected to the called subscriber. In step 771, the text comprising the variable ANNOUNCE is used to generate speech signals for transmission to station 23, and the text-to speech unit is thereafter deallocated. In step 772, the first caller and the called subscriber are reconnected, and execution proceeds to conditional branch point 601.

Figure 4:
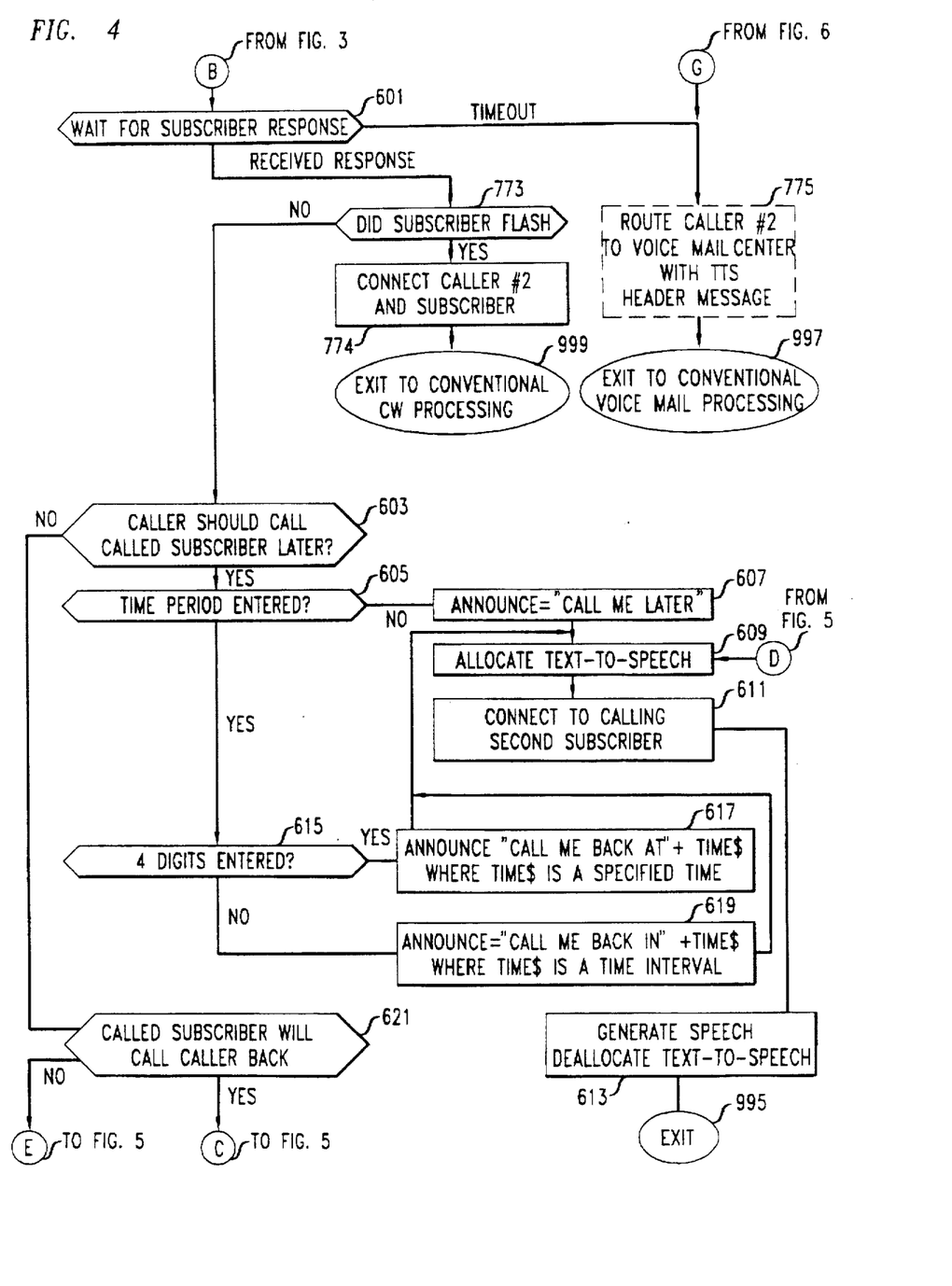

In conditional branch point 601 the system waits either until a predetermined amount of time has elapsed or a signal is received from the called subscriber as to how to handle the call from the second caller. To this end, a timer is activated in step 601, which is used to time from the announcement and is set to expire after a predetermined time has elapsed, e.g., 15 seconds.

The called subscriber may signal the conventional responses of a) placing the first telephone call on hold and answering the second telephone call request, e.g., by flashing the switch hook; or b) simply declining acceptance of the subsequent telephone call request, e.g., by ignoring the announcement and continuing on the first telephone call until the predetermined time has expired. Alternatively, in accordance with the principles of the invention, the called subscriber may signal the additional responses of 1) declining acceptance of the subsequent telephone call request but requesting the subsequent telephone call originator to try again at a predetermined time or at the end of a specified period of time, e.g., by pressing a particular key or key sequence on his telephone, such as "*1" (star one) followed by a time indicator, such as "15" for 15 minutes or "1230" for 12:30; 2) declining acceptance of the subsequent telephone call request and informing the subsequent telephone call originator that the called subscriber will return the call at a predetermined time or at the end of a specified period of time, e.g., by pressing a particular key or key sequence on his telephone, such as "*2"(star two) followed by a time indicator; 3) bridging the subsequent telephone call originator with the first telephone call to establish a conference, e.g., by pressing a particular key or key sequence on his telephone, such as "*3"(star three); 4) directing that the telephone call be transferred to another telephone number, extension, or location, e.g., by pressing a particular key or key sequence on his telephone, such as "*4"(star four) followed by digits that are an indicator of where the call should be transferred to; or 5) expressly indicating that the second call should be ignored and that call waiting should be disabled for this particular caller, all callers except those listed on a so-called "exception" list, or all callers, e.g., by pressing a particular key or key sequence on his telephone, such as "*9"(star nine) followed by digits that are an indicator of the particular type of disabling that is desired.

If no signal is detected in step 601 prior to expiration of the timer, the connection between the first caller and the called subscriber is maintained and control passes to step 775. In step 775 the second caller is routed to a voice mail center and a TTS is allocated to play the contents of ANNOUNCE as the voice mail header. After storing the header the process exits to conventional voice mail processing in step 999.

If, in step 601, prior to the expiration of the timer, a signal, e.g., a switch hook flash or DTMF digit, transmitted by the called subscriber is detected, execution proceeds to conditional branch point 773, in which a determination is made as to whether or not the signal from the called subscriber was a switch hook flash. If it is determined in step 773 that the called subscriber station flashed, indicating that the called subscriber desires to interrupt the conversation with the first caller and speak to the second caller, execution proceeds from step 773 to step 774, and the second caller and the called subscriber are connected. The process is then exited in step 997 to a conventional call waiting processing routine.

If it is determined in step 773 that the signal received from the called subscriber station in step 601 was not a flash, the signal received from the called subscriber station in step 601 must have been a DTMF signal transmitted in response to the called subscriber pressing a key, or sequence of keys, at the called subscriber station. Therefore, execution proceeds from step 601 to conditional branch point 603, in which a determination is made as to whether or not the called subscriber signaled that he is declining acceptance of the subsequent telephone call request and instead he desires that the second caller should call him back later. If the determination is made in step 603 that the particular key or key which is required to activate this feature, such as "*1" (star one), has been received from the called subscriber, control passes to conditional branch point 605 to determine if a particular time or period has been indicated by the called subscriber, e.g., by his entry of further digits. If the determination in step 605 is that the called subscriber has not entered further digits, in accordance with an aspect of the invention, the variable ANNOUNCE is set to "CALL ME LATER" in step 607. A text-to speech unit is allocated in step 609, and the allocated text-to-speech unit is connected to the calling subscriber in step 611. In step 613, the text comprising the variable ANNOUNCE is used to generate speech signals for transmission to the calling subscriber, and the text-to speech unit is, thereafter, deallocated. The process is then exited in step 995.

If the determination in step 605 is that the called subscriber has entered further digits, a determination is made in conditional branch point 615 if four digits, or less than four digits, were entered. If four digits were entered, it is assumed that the called subscriber entered a particular time, e.g., "1""4""1""5"for 14:15 hours. Therefore, in accordance with an aspect of the invention, in step 617 the variable ANNOUNCE is set to the concatenated value of "CALL ME BACK AT" and time$, where time$ is a phrase developed using text-to-speech processing for converting the called subscriber supplied time into speech. Thereafter, control passes back to step 609, and the process continues as described above. Note that those of ordinary skill in the art will recognize that a twelve-hour clock, as opposed to a 24-hour clock, may be used if an additional digit is collected as a discriminator between AM and PM, e.g., "2" or "A" for AM and "7" or "P" for PM.

If the determination in step 615 is that the called subscriber has entered less than 4 digits, it is assumed that the called subscriber entered an interval of time after which he desires the calling subscriber to call him back, e.g., "4""5" for 45 minutes. Therefore, in accordance with an aspect of the invention, in step 619 the variable ANNOUNCE is set to the concatenated value of "CALL ME BACK IN" and time$, where time$ is a phrase developed using text-to-speech processing for converting the called subscriber supplied time into speech, e.g., ANNOUNCE is set to "CALL ME BACK IN FORTY FIVE MINUTES". Thereafter, control passes back to step 609 and the process continues as described above.

If the determination in step 603 is that the called subscriber did not signal that he wants the caller to call back, then, in conditional branch point 621, a determination is made as to whether or not the called subscriber signaled that he is declining acceptance of the subsequent telephone call request and instead he will call the second caller back later. If the determination is made in step 621 is that the particular key, or key sequence, which is required to activate this feature, such as "*2" (star two), has been received from the called subscriber, control passes to conditional branch point 625 to determine if a particular time or period has been indicated by the called subscriber, e.g., by his entry of further digits. If the determination in step 625 is that the called subscriber has not entered further digits, in accordance with an aspect of the invention, the variable ANNOUNCE is set to "I WILL CALL YOU LATER" in step 627. Control then passes back to step 609, and the process continues as described above.

If the determination in step 625 is that the called subscriber has entered further digits, a determination is made in step 635 if four digits, or less than 4 digits, were entered. If four digits were entered, it is assumed that the called subscriber entered a particular time, as described above. Therefore, in accordance with an aspect of the invention, in step 637, the variable ANNOUNCE is set to the concatenated value of "I WILL CALL YOU BACK AT" and time$, where time$ is a phrase developed using text-to-speech processing for converting the called subscriber supplied time into speech. Thereafter, control passes back to step 609, and the process continues as described above.

If the determination in step 625 is that the called subscriber has entered less than 4 digits, it is assumed that the called subscriber entered an interval of time after which he desires the calling subscriber to call him back, as described above. Therefore, in accordance with an aspect of the invention, in step 639 the variable ANNOUNCE is set to the concatenated value of "I WILL CALL YOU BACK IN" and time$, where time$ is a phrase developed using text-to-speech processing for converting the called subscriber supplied time into speech, e.g., ANNOUNCE is set to "of "I WILL CALL YOU BACK IN FIFTEEN MINUTES". Thereafter, control passes back to step 609, and the process continues as described above.

Figure 5:
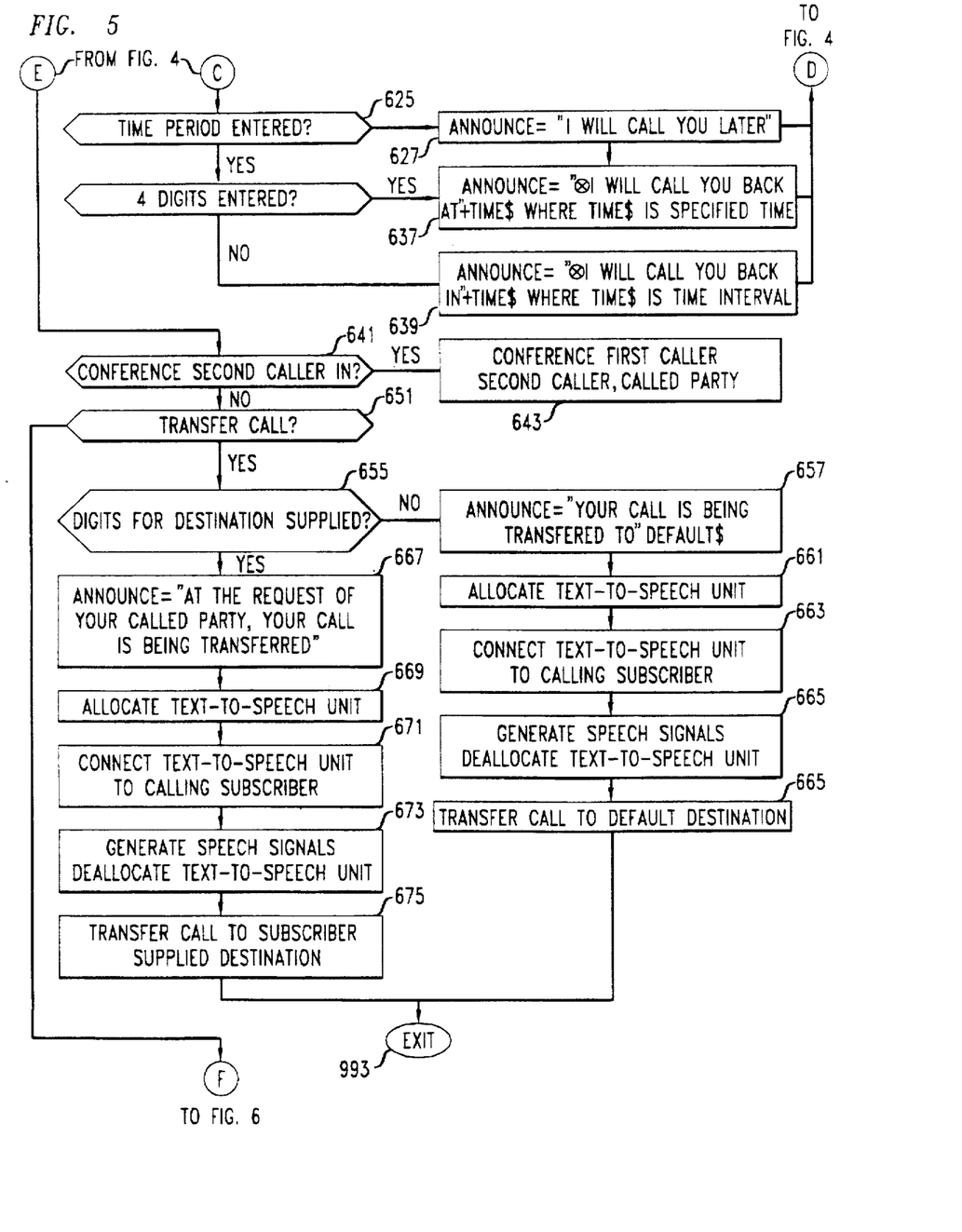

If the determination in step 621 is that the called subscriber did not signal that he will call the second caller back later, then, in conditional branch point 641, a determination is made as to whether or not the called subscriber signaled that he wants to conference the calling subscriber with the subscriber to whom he is already speaking, so that a three-way conversation is established. If the determination made in step 641 is that the particular key, or key sequence, which is required to activate this feature, such as "*3" (star three), has been received from the called subscriber, then, in step 643, the second caller, the first caller, and the called subscriber are bridged together, so that each can speak to and hear each of the others, in accordance with an aspect of the invention. Such conferencing may be performed by a TSIU or a dedicated conferencer. Advantageously, a conference call can be established from a conventional tip and ring (TR) telephone type device on a conventional TR line from a central office a) without the conferencer having to initiate any of the calls being conferenced and b) without having to put any of the parties to the conference on hold.

Optionally, to better inform the second calling party that there is another person on the call in addition to the called subscriber, prior to conferencing the second caller in with the first caller and the called subscriber, in accordance with an aspect of the invention, an announcement to that effect may be supplied to the second calling party. This may be done, for example, by a) setting ANNOUNCE to "YOU ARE BEING CONFERENCED IN WITH THE PARTY YOU CALLED AND ANOTHER PARTY", b) allocating a text-to-speech unit, c) connecting the allocated text-to-speech unit to the calling subscriber, d) using the text comprising the variable ANNOUNCE to generate speech signals that are transmitted to calling subscriber, d) deallocating the text-to speech unit, and, thereafter, e) bridging the parties. In a more sophisticated implementation, where the name or telephone number of the first calling party was announced to the called subscriber, such as the aforementioned U.S. Pat. No. 5,007,076 issued to J. R. Blakley, and this name or number was stored in ANNOUNCE, prior to the immediately above step (a) OLDANNOUNCE is set to the value of ANNOUNCE, and then, in step (a), ANNOUNCE is set to the concatenated value of "YOU ARE BEING CONFERENCED IN WITH THE PARTY YOU CALLED AND" and OLDANNOUNCE. The process then proceeds as described immediately hereinabove at step (b).

If the determination in step 641 is that the called subscriber does not desire a conference call, then, in conditional branch point 651, a determination is made as to whether or not the called subscriber signaled that he is declining acceptance of the subsequent telephone call request, and, instead, he wishes to transfer the calling subscriber to another telephone number, extension, or location, e.g., a secretary or voice messaging system. If the determination made in step 651 is that the particular key or key sequence which is required to activate this feature, such as "*4" (star four), has been received from the called subscriber, control passes to conditional branch point 655 to determine if a particular destination has been indicated by the called subscriber, e.g., by his entry of further digits. If the determination in step 655 is that the called subscriber has not entered further digits, optionally, in step 657, the variable ANNOUNCE is set to the concatenated value of "YOUR CALL IS BEING TRANSFERRED TO" and DEFAULTS, where DEFAULTS is text string indicative of a preselected default destination to where the call is being transferred, e.g., "MY SECRETARY", "MY VOICE MAIL BOX", or "MY CELLULAR TELEPHONE". A text-to-speech unit is allocated in step 659 and the allocated text-to-speech unit is connected to the calling subscriber in step 661. In step 663, the text comprising the variable ANNOUNCE is used to generate speech signals for transmission to calling subscriber and the text-to speech unit is then deallocated. Thereafter, in step 665, the calling subscriber's call is transferred to the default destination.

If the determination in step 655 is that the called subscriber has entered further digits, in accordance with an aspect of the invention, optionally, in step 667, the variable ANNOUNCE is set to "AT THE REQUEST OF YOUR CALLED SUBSCRIBER, YOUR CALL IS BEING TRANSFERRED". Optionally, the value of ANNOUNCE may be set by concatenating a string indicative of the transfer with a string indicative of the destination to which the call is to be transferred, e.g., a) the telephone number or extension supplied by the called subscriber or b) a text string corresponding to the telephone number supplied by the called subscriber, such as the name of the person to whom that number corresponds. A text-to-speech unit is allocated in step 669, and the allocated text-to-speech unit is connected to the calling subscriber in step 671. In step 673, the text comprising the variable ANNOUNCE is used to generate speech signals for transmission to calling subscriber, and the text-to speech unit is then deallocated. Thereafter, in step 675, the calling subscriber's call is transferred to the destination indicated by the additional digits supplied by the called subscriber. Note that various translations, e.g., lookup, hashing, etc. may be performed on the number supplied by the called subscriber in order to determine the actual destination to which the calling subscriber's call is to be transferred as well as the text indicator thereof which is concatenated into ANNOUNCE. Also note that the destination to which a transfer is made need not be limited to destinations directly served by switch 100. Optionally, the destination may be translated into a representation that can be concatenated with ANNOUNCE, e.g., the name of the party to which the caller is being transferred or an extension number, and also spoken to the calling subscriber. The process is then exited in step 993.

Figure 6:
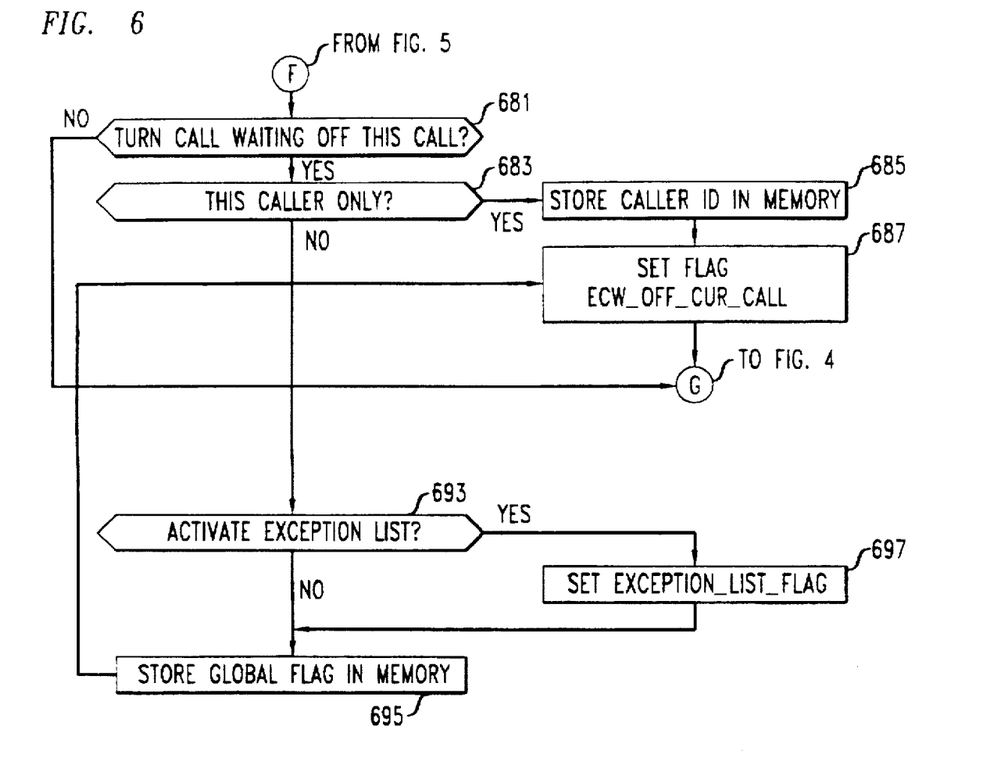

If the determination in step 651 is that the called subscriber does not desire to transfer the second call control passes to conditional branch point 681. In conditional branch point 681, a determination is made as to whether or not the called subscriber expressly signaled an intention to decline acceptance of the second telephone call as well as to disable call waiting, or limit its operation, for so long as he remains on the first call, e.g., by pressing a particular key, or key sequence, on his telephone, such as "*9" (star nine) followed by digits that are an indicator of the particular type of disabling or limitation that is desired. If the determination in step 681 is that the called subscriber signaled, e.g., via transmitting an additional "1", that he is declining acceptance of the second telephone call and that he desires to disable or limit call waiting, then, in conditional branch point 683, a determination is made as to whether or not the called subscriber signaled that he wishes to limit call waiting by disabling it only for calls from the second caller, e.g., as identified by the calling line identification information, while the first call continues. If the determination in step 683 is that the called subscriber signaled that he indeed wishes to limit call waiting by disabling it only for additional calls from the second caller, in step 685 an indication of the identification of the second caller is stored in memory. Then, in step 687, the flag ECW_OFF_CUR_CALL is set. Note that the value of this flag will be checked upon the arrival of subsequent calls in step 721, as described above, and when the flag is set and the callers identification is found to be stored in memory, enhanced call waiting will not be provided. Control then passes back to step 775, to store a voice mail message from the caller, if any.

If the determination in step 683 is that the called subscriber signaled, e.g., via transmitting an additional "2" or an additional "3", that he is declining acceptance of the second telephone call and that he desires to disable call waiting for all future calls that arrive while the first call continues, then, in conditional branch point 693, a determination is made as to whether or not the called subscriber signaled that he nevertheless wishes to enable call waiting for selected predetermined callers, e.g., as identified by the calling line identification information, who are listed in a prestored so-called "exception list". If the determination in step 693 is that the called subscriber signaled, e.g., via transmitting an additional "2", that he desires to disable call waiting for all future calls that arrive while the first call continues without exception, then, in step 695, a global flag is stored in memory as the first number of the list of numbers for which call waiting is to be disabled, i.e., the list on which a caller's identification would be stored in step 685. If the determination in step 693 is that the called subscriber signaled, e.g., via transmitting an additional "3", that he desires to disable call waiting while the first call continues for all future calls except for selected predetermined callers for which call waiting will remain enabled, in step 697 a flag, e.g., an Exception_List_Flag, is set. Then, in step 695, a global flag is stored in memory as the first number of the list of numbers for which call waiting is to be disabled. From step 697 control passes back to step 687 and the process continues as described above.

In accordance with another aspect of the invention, if appropriate, the caller may respond to the called subscriber's message with a message of his own, e.g., by supplying DTMF signals that are received and interpreted by switch 100. For example, if the called subscriber signaled that he will call the caller back in 15 minutes, the caller could signal back, in response to the announcement, "*830" which would result in an announcement to the called subscriber of "Please make it 30 minutes". In this example, the *8 indicates to send back a message "Please make it" and the 30 indicates thirty minutes.

Figure 7:
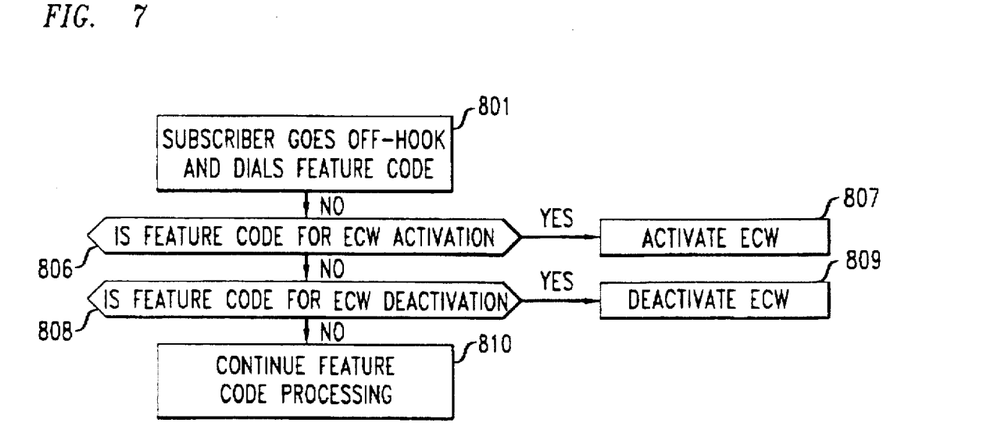
FIG. 7 is a flow chart of the feature activation and deactivation processing.

FIG. 7 is a flow chart of the feature activation and deactivation processing. In step 801, a subscriber goes off-hook and dials a feature code. In conditional branch point 806 it is determined whether the dialed feature code is an enhanced call waiting (ECW) activation. If it is, the activation is effected in step 807. If the feature code is not an ECW activation, execution proceeds to conditional branch point 808, where it is determined whether the dialed feature code is an ECW deactivation. If it is, the deactivation is effected in step 809. If the feature code is not an ECW deactivation, execution proceeds to step 810 for continued feature code processing.

An announcement unit using voice recordings of calling party names may be used rather than a text-to-speech unit in some applications. Also, rather than be incorporated directly into the telephones, a display may be incorporated into an unit that is associated with the telephone.

Voice recognition technology or other input techniques may be used in lieu of, or in addition to, switch hook flashes and DTMF signals. Various messages and signaling arrangements may also be developed.

The foregoing merely illustrates the principles of the inventions. It will thus be appreciated that those skilled in the art will be able to devise various arrangements which, although not explicitly described or shown herein, embody the principles of the invention and are included within its spirit and scope.

What is claimed is:

1. A method for use in providing enhanced call waiting service to a subscriber thereof who is on a first telephone call when a second telephone call arrives, comprising the steps of:

determining that said subscriber had previously signaled during the existence of said first telephone call that call waiting service was to be disabled during the continued existence of said first telephone call;

determining the type of disabling selected by said subscriber from a plurality of available types; and treating said second telephone call in accordance with said type of disabling selected by said subscriber.

2. The invention as defined in claim 1 wherein one of said plurality of types is disallowing of call waiting for all callers except those identified by an exception list.

3. The invention as defined in claim 2 wherein said treating step comprises the steps of:

determining that said second telephone call is not listed in said list; and inhibiting operation of any further call waiting processing for said second telephone call.

4. The invention as defined in claim 2 wherein said treating step comprises the steps of:

determining that said second telephone call is not listed in said list; and completing enhanced call waiting processing for said second telephone call.

5. The invention as defined in claim 1 wherein one of said plurality of types is the disallowing of call waiting only for a predetermined list of one or more callers.

6. The invention as defined in claim 5 wherein said callers listed in said list had previously called said subscriber during the existence of said first telephone call.

7. The invention as defined in claim 6 wherein said treating step comprises the steps of:

determining that said second telephone call is listed in said list; and inhibiting operation of any further call waiting processing for said second telephone call.

8. The invention as defined in claim 1 wherein one of said plurality of types is the disallowing of call waiting for all callers without exception.

9. The invention as defined in claim 8 wherein said step of treating comprises the step of inhibiting operation of any further call waiting processing for said second telephone call.

10. The invention as defined in claim 8 wherein said step of treating comprises the step of processing said second telephone call as if said subscriber was not a subscriber to call waiting service.

11. A method for use in providing enhanced call waiting service to a subscriber thereof who is on a first telephone call when a second telephone call arrives, wherein said subscriber had previously signaled during the existence of said first telephone call that call waiting service was to be disabled during the continued existence of said first telephone call, the method comprising the steps of:

determining the type of disabling selected by said subscriber; and providing call waiting service for said second telephone call only when such service is not indicated to be unavailable for said second telephone call as a function of both the type of disabling selected by said subscriber and information available about said second telephone call.

12. Apparatus for processing telephone calls to a telephone for which enhanced call waiting has been provisioned, and for which an indication of call waiting disablement has been stored during a first telephone call for said first telephone call only, the apparatus comprising:

means for detecting a second telephone call destined to said telephone during continued existence of said first telephone call; and means for providing of call waiting service for said second telephone call;

wherein said means for providing call waiting service provides such service only when such service is not indicated to be disabled for said second telephone call as a joint function of a type of disablement indicated and information available about said second telephone call.

13. Apparatus for processing telephone calls to a telephone for which enhanced call waiting has been provisioned, the apparatus comprising:

means for determining that said called telephone is on a first telephone call;

means for detecting a second telephone call destined to said telephone;

means for storing an indication of call waiting disablement for said first telephone call and a type thereof after said determining means determined that said called telephone is on said first telephone call; and means, responsive to storage of an indication prior to detection of said second telephone call, for providing call waiting service for said second telephone call only when such service is not indicated to be disabled for said second telephone call as function of both the type of disabling indicated by said stored indication and information available about said second telephone call.

14. The invention as defined in claim 13 wherein said indication is stored in response to a message received from said called telephone during said first telephone call.

15. Apparatus for processing telephone calls to a called telephone for which an indication of call waiting disablement has been stored during a first telephone call from a first calling telephone for a duration of said first telephone call only, the apparatus comprising:

means for detecting a second telephone call destined to said called telephone during continued existence of said first telephone call;

means for supplying a signal indicating existence of said second telephone call to said called telephone over a voice communication channel to said called telephone substantially upon detection of said second telephone call; and means for inhibiting operation of said means for supplying in response to said stored indication.

16. The invention as defined in claim 15 wherein said apparatus further includes means for disconnecting voice communication from said first calling telephone to said called telephone, said means for disconnecting being responsive to, and inhibited from operating by, said means for inhibiting.

17. The invention as defined in claim 15 wherein said signal provides information regarding an identity associated with a second telephone calling telephone from which said second telephone call is originated.

18. Apparatus for processing telephone calls to a called telephone for which enhanced call waiting has been provisioned, and for which an indication of call waiting disablement has been stored during a first telephone call from a first calling telephone for said first telephone call only, the apparatus comprising:

means for detecting a second telephone call destined to said called telephone during continued existence of said first telephone call;

means for disconnecting a communication path of said first telephone call between said called telephone and a first calling telephone; and means for supplying an indication indicating existence of said second telephone call over said communication path;

wherein said means for providing an indication of the arrival of said second telephone call does so only when call waiting service is not indicated to be disabled for said second telephone call as a joint function of a type of disablement indicated and information available about said second telephone call.

19. The invention as defined in claim 18 further comprising means for receiving said information about said second telephone call.

20. The invention as defined in claim 19 further comprising means for translating said received information.

21. Apparatus for processing telephone calls to a called telephone for which an indication of call waiting disablement has been stored during a first telephone call from a first calling telephone for a duration of said first telephone call only, the apparatus comprising:

means for detecting a second telephone call destined to said called telephone during continued existence of said first telephone call;

means for supplying a signal suitable for visual display and indicating existence of said second telephone call to said called telephone to said called telephone substantially upon detection of said second telephone call; and means for inhibiting operation of said means for supplying in response to said stored indication.

22. A method for use in providing enhanced call waiting service to a subscriber thereof who is on a first telephone call when a second telephone call arrives, comprising the steps of:

determining that said subscriber had previously signaled during the existence of said first telephone call that call waiting service was to be disabled during the continued existence of said first telephone call;

determining the type of disabling selected by said subscriber from a plurality of available types; and treating said second telephone call in accordance with said type of disabling selected by said subscriber;

wherein one of said plurality of types is the disallowing of call waiting only for a predetermined list of one or more callers and at least one of said callers listed in said list became listed in said list when they previously called said subscriber during the existence of said first telephone call.

* * * * *